United States Patent
Koike

(10) Patent No.: US 11,574,161 B2
(45) Date of Patent: Feb. 7, 2023

(54) WIRELESS TAG PROCESSING DEVICE CONFIGURED TO SELECT FROM LISTS A PARAMETER VALUE TO BE USED TO COMMUNICATE WITH A WIRELESS TAG

(71) Applicant: TOSHIBA TEC KABUSHIKI KAISHA, Tokyo (JP)

(72) Inventor: Yuki Koike, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/469,785

(22) Filed: Sep. 8, 2021

(65) Prior Publication Data

US 2021/0406634 A1 Dec. 30, 2021

Related U.S. Application Data

(63) Continuation of application No. 16/893,407, filed on Jun. 4, 2020, now Pat. No. 11,144,806.

(30) Foreign Application Priority Data

Sep. 4, 2019 (JP) .............................. JP2019-161228

(51) Int. Cl.
*G06K 19/077* (2006.01)
(52) U.S. Cl.
CPC . *G06K 19/07716* (2013.01); *G06K 19/07718* (2013.01)

(58) Field of Classification Search
CPC ................... G06K 19/07716; G06K 19/07718
USPC ....................... 235/492, 451; 340/572.1, 10.1
See application file for complete search history.

(56) References Cited

U.S. PATENT DOCUMENTS

| 9,147,137 | B2 | 9/2015 | Kuniya |
| 11,144,806 | B2* | 10/2021 | Koike ........................ B41J 3/50 |
| 2010/0141394 | A1 | 6/2010 | Sugiyama |
| 2011/0050421 | A1 | 3/2011 | Duron et al. |
| 2014/0035733 | A1 | 2/2014 | Yamamoto |
| 2016/0103198 | A1 | 4/2016 | Swope et al. |
| 2020/0215827 | A1* | 7/2020 | Koike ................ G06K 17/0025 |

* cited by examiner

*Primary Examiner* — Suezu Ellis
(74) *Attorney, Agent, or Firm* — Kim & Stewart LLP

(57) ABSTRACT

A wireless tag processing device includes a wireless tag reader-writer and a processor configured to acquire first and second sets of parameter values, control the reader-writer to transmit a radio wave using each parameter value of the first set and acquire a first intensity of a response wave from a wireless tag, when a highest first intensity satisfies a first condition, determine a parameter value of the first set corresponding to the highest intensity as a parameter value to be used by the reader-writer, and when the highest intensity does not satisfy the condition, control the reader-writer to transmit a radio wave using each parameter value of the second set and acquire a second intensity, and when a highest second intensity satisfies a second condition, determine a parameter value of the second set corresponding to the highest second intensity as the parameter value to be used by the reader-writer.

16 Claims, 7 Drawing Sheets

WIRELESS TAG PROCESSING DEVICE CONFIGURED TO SELECT FROM LISTS A PARAMETER VALUE TO BE USED TO COMMUNICATE WITH A WIRELESS TAG

CROSS-REFERENCE TO RELATED APPLICATION

This application is a continuation of U.S. patent application Ser. No. 16/893,407, filed Jun. 4, 2020, which is based upon and claims the benefit of priority from Japanese Patent Application No. 2019-161228, filed on Sep. 4, 2019 the entire contents of which are incorporated herein by reference.

FIELD

Embodiments described herein generally relate to a wireless tag processing device and a method.

BACKGROUND

There are known wireless tag processing devices for acquiring data from wireless tags, such as RFID (Radio Frequency Identification) tags. When a wireless tag is detected within a predetermined area, such wireless tag processing devices determine an intensity of a radio wave to be transmitted to the wireless tag in order to acquire data from the wireless tag. For example, the wireless tag processing devices try a plurality of preset intensities for transmission of the interrogating radio wave and then select the appropriate intensity. However, it may take much time to select one particular intensity when several possible intensities are available to the wireless tag processing devices.

DETAILED DESCRIPTION

One or more embodiments provide a wireless tag processing device and a method for determining an output intensity value.

According to the embodiment, a wireless tag processing device includes a wireless tag reader-writer configured to communicate with a wireless tag and a processor configured to acquire a first set of parameter values and a second set of parameter values that are different from the parameter values of the first set, control the wireless tag reader-writer to transmit a radio wave using each of the parameter values of the first set and acquire a first intensity of a response wave received from the wireless tag corresponding to each of the parameter values of the first set, when a highest first intensity of the response wave satisfies a first predetermined condition, determine one of the parameter values of the first set corresponding to the highest first intensity as a parameter value to be used by the wireless tag reader-writer, and when the highest first intensity does not satisfy the first predetermined condition, control the wireless tag reader-writer to transmit a radio wave using each of the parameter values of the second set and acquire a second intensity of a response wave received from the wireless tag corresponding to each of the parameter values of the second set, and when a highest second intensity of the response wave satisfies a second predetermined condition, determine one of the parameter values of the second set corresponding to the highest second intensity as the parameter value to be used by the wireless tag reader-writer.

Hereinafter, example embodiments will be described in detail with reference to the drawings.

A wireless tag processing device according to an embodiment acquires data from a wireless tag. The wireless tag processing device sets parameters, such as an output value and a position of the wireless tag, for acquiring data from a wireless tag. The wireless tag processing device wirelessly communicates with the wireless tag based on the parameters and thus acquires data from the wireless tag.

For example, the wireless tag processing device has a label 43 (see FIG. 3) including a wireless tag 44 (see FIG. 3) therein or within a communication range thereof. The wireless tag processing device conveys the label 43 to a predetermined position, and acquires (reads) data from the wireless tag 44 in the label 43. The wireless tag processing device can also store (write) predetermined data in the wireless tag 44. The wireless tag processing device can print an image on the label 43. The wireless tag processing device conveys the label 43 on which an image has been printed and then discharges the printed label 43 to the outside.

Figure 1:
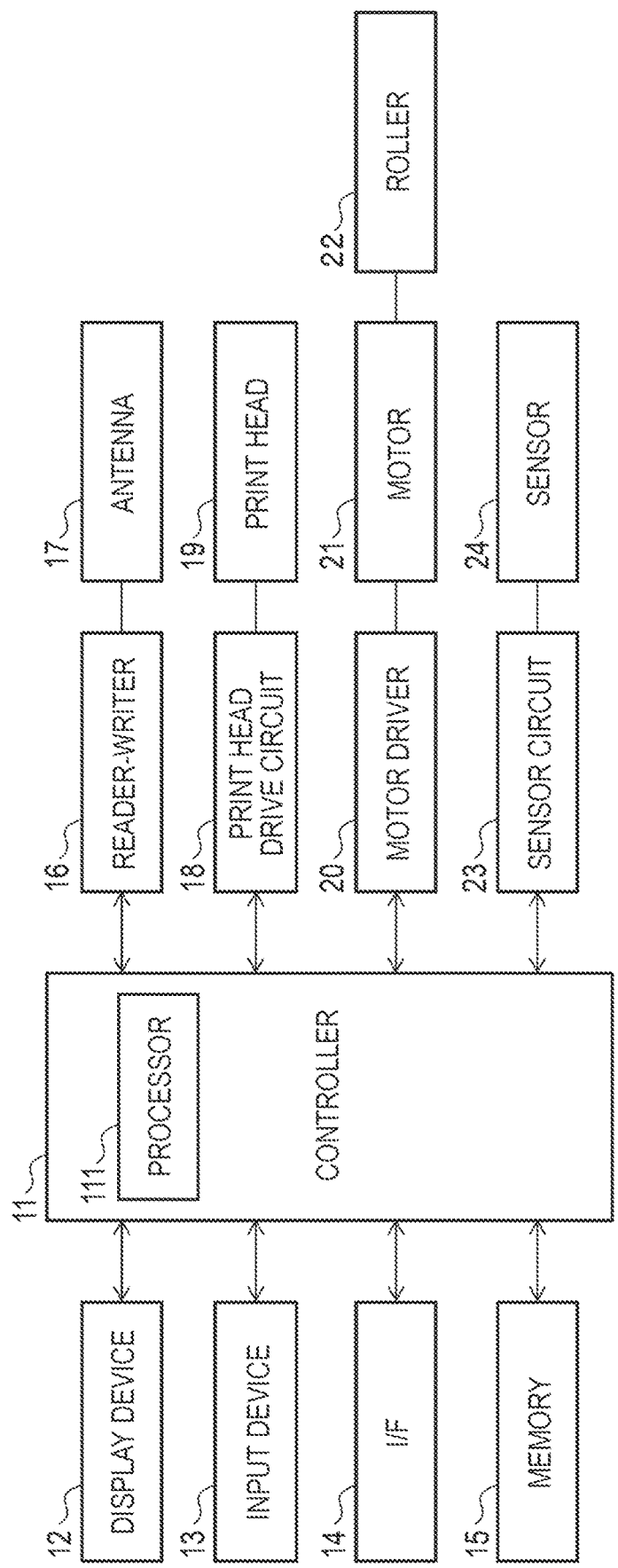
FIG. 1 is a block diagram illustrating a configuration of a wireless tag processing device according to an embodiment.

FIG. 1 is a block diagram illustrating a configuration of a wireless tag processing device 1. As illustrated in FIG. 1, the wireless tag processing device 1 includes a controller 11, a display device 12, an input device 13, an interface (I/F) 14, a memory 15, a reader-writer 16, an antenna 17, a print head drive circuit 18, a print head 19, a motor driver 20, a motor 21, rollers 22, a sensor circuit 23, a sensor 24, and the like.

The controller 11, the display device 12, the input device 13, the interface 14, the memory 15, the reader-writer 16, the print head drive circuit 18, the motor driver 20, and the sensor circuit 23 are connected to each other via a data bus or the like.

The reader-writer 16 and the antenna 17 are electrically connected to each other. The print head drive circuit 18 and the print head 19 are electrically connected to each other. The motor driver 20 and the motor 21 are electrically connected to each other. The motor 21 and the rollers 22 are physically connected to each other. The sensor circuit 23 and the sensor 24 are electrically connected to each other.

The wireless tag processing device 1 may include one or more additional components as necessary in addition to the components illustrated in FIG. 1, and one or more of the components shown in FIG. 1 may be excluded from the wireless tag processing device 1.

The controller 11 controls the wireless tag processing device 1. The controller 11 includes a processor 111 and the like.

The processor 111 controls the operation of the controller 11. In other words, the processor 111 controls the wireless tag processing device 1. The processor 111 may include an internal memory, various interfaces, and the like. The processor 111 performs various processes by executing a program stored in the internal memory, the memory 15, or the like in advance.

Some of the various functions may be performed by a hardware circuit. Here, the processor 111 controls a function executed by the hardware circuit.

The display device 12 displays various information under the control of the processor 111. For example, the display device 12 includes a liquid crystal monitor.

The input device 13 accepts input of various operations from an operator. The input device 13 transmits a signal indicating the accepted operation to the processor 111. For example, the input device 13 includes a keyboard, numeric keys, and a touch panel. The input device 13 and the display device 12 may be integrated into a touch-enabled display.

The interface 14 is an interface for transmitting and receiving data to and from an external device. For example, the interface 14 transmits and receives data to and from an external device via a network such as a local area network (LAN). For example, the interface 14 receives data to be stored in a wireless tag from an external device. The interface 14 may be an interface that supports a universal serial bus (USB) connection.

The memory 15 is a storage device such as a rewritable nonvolatile memory. For example, the memory 15 includes a solid state drive (SSD) or a hard disk drive (HDD). The memory 15 may store a program executed by the processor 111, control data, and the like.

The reader-writer 16 is a device that performs wireless communication with a wireless tag via the antenna 17. The reader-writer 16 emits a transmission wave via the antenna 17. For example, the reader-writer 16 outputs an unmodulated wave as a transmission wave via the antenna 17. The reader-writer 16 receives a response wave from the wireless tag via the antenna 17 and demodulates the response wave. The reader-writer 16 acquires data from the wireless tag by demodulating the response wave.

For example, the reader-writer 16 reads identification information (for example, an electronic product code (EPC)) from the wireless tag. The reader-writer 16 measures the reception intensity of the radio wave received from the wireless tag. The reception intensity is a response wave intensity of the wireless tag of the label.

The reader-writer 16 stores predetermined data in the wireless tag based on a signal from the controller 11. For example, the reader-writer 16 transmits a signal obtained by encoding write data or the like to the wireless tag via the antenna 17.

The reader-writer 16 sets an output value indicating an intensity of a radio wave output from the antenna 17 to the wireless tag. The reader-writer 16 can set one output value among the plurality of settable output values according to the control from the processor 111. The reader-writer 16 outputs a radio wave based on the set output value.

The antenna 17 is an antenna for the reader-writer 16 to perform the wireless communication with the wireless tag 44. For example, the antenna 17 is installed to be adjacent to a conveyance path on which the wireless tag is conveyed. The antenna 17 may be a directional antenna having directivity on the conveyance path.

The print head drive circuit 18 controls the print head 19 according to a signal from the controller 11. For example, the print head drive circuit 18 sends power and a control signal to the print head 19.

The print head 19 prints an image on the label based on the control of the print head drive circuit 18. For example, the print head 19 is an ink jet head that discharges ink droplets, and the like. The print head 19 may print a monochrome image on the label or may print a color image on the label. When the label is made of thermal paper, the print head 19 prints an image by heating the label.

The motor driver 20 controls the motor 21 according to a signal from the controller 11. For example, the motor driver 20 transmits power and a control signal to the motor 21.

The motor 21 drives the rollers 22 based on the control of the motor driver 20. For example, the motor 21 is a stepping motor or the like.

The rollers 22 convey a label roll paper sheet, which will be described later, including the label. The rollers 22 are rotated by a driving force from the motor 21. The rollers 22 rotate and convey the label roll paper sheet in a predetermined direction.

The motor driver 20, the motor 21, and the rollers 22 make up a convey unit that conveys the wireless tag included in the label roll paper sheet.

The sensor circuit 23 controls the sensor 24 according to a signal from the controller 11. For example, the sensor circuit 23 transmits power and a control signal to the sensor 24.

The sensor 24 reads a mark, which will be described later, formed on the label roll paper sheet. When reading the mark, the sensor 24 transmits a predetermined signal to the sensor circuit 23. For example, the sensor 24 is an optical sensor or the like.

Figure 2:
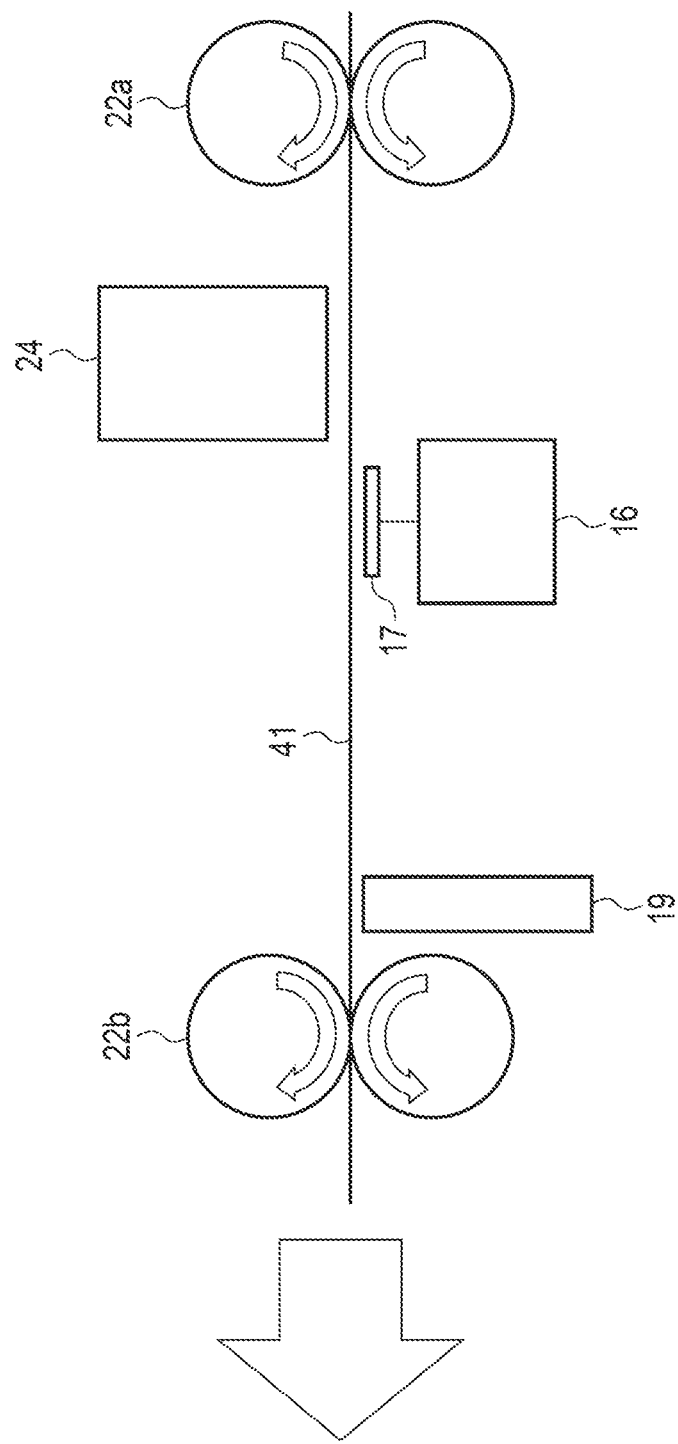
FIG. 2 is a view illustrating a configuration of a print head according to an embodiment.

FIG. 2 is a view illustrating a positional relationship of the antenna 17, the print had 19, the sensor 24, and a label roll paper sheet 41. As illustrated in FIG. 2, the rollers 22 includes rollers 22*a* and rollers 22*b*. The rollers 22*a* and the rollers 22*b* are arranged at predetermined intervals. A label roll paper sheet 41 is moved from the roller 22*a* to the roller 22*b*. Here, the roller 22*a* is located on the upstream side, and the roller 22*b* is located on the downstream side.

The rollers 22*a* and rollers 22*b* are each configured as a pair of rollers for nipping and conveying the label roll paper sheet 41. Here, the label roll paper sheet 41 is set such that the front surface (i.e., the print surface) faces downward.

The sensor 24 is formed downstream of the rollers 22*a*. The sensor 24 detects the mark formed on the back surface of the label roll paper sheet 41.

The antenna 17 is located downstream of the sensor 24. The antenna 17 is located so as to face the front surface of the label roll paper sheet 41.

The print head 19 is located downstream of the antenna 17. In other words, the print head 19 forms an image on the front surface of a label included in the label roll paper sheet 41.

The roller 22*b* is located downstream of the print head 19.

Figure 3:
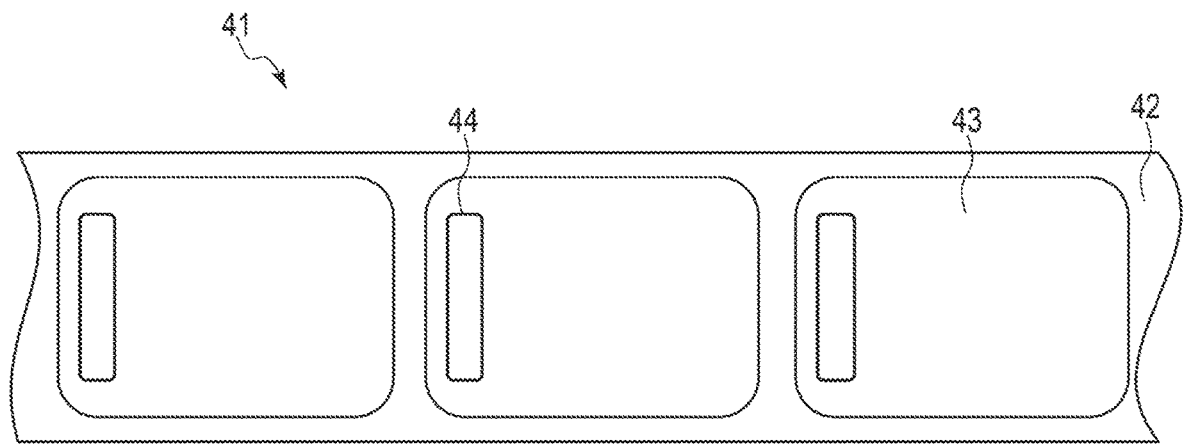
FIG. 3 is a view illustrating the front surface of a label roll paper sheet according to an embodiment.
Figure 4:
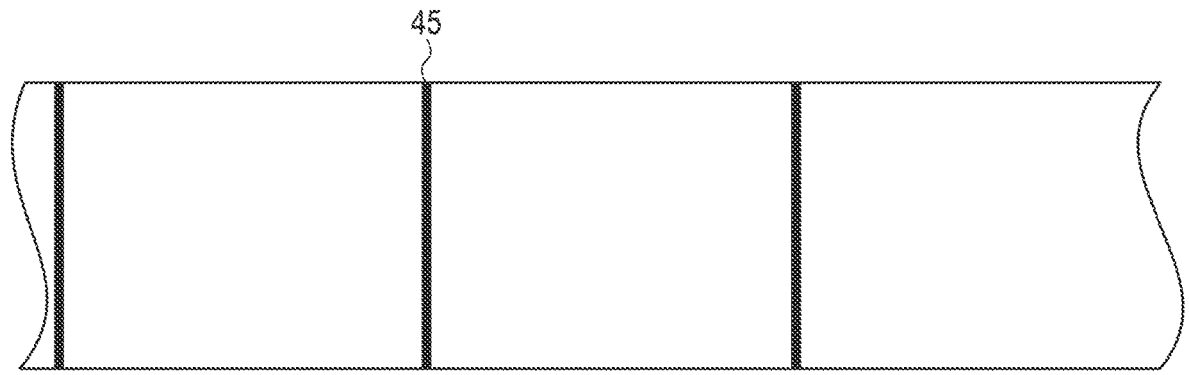
FIG. 4 is a view illustrating the back surface of the label roll paper sheet.

Next, the label roll paper sheet 41 will be described. FIG. 3 illustrates the front surface of the label roll paper sheet 41. FIG. 4 illustrates the back surface of the label roll paper sheet 41.

The label roll paper sheet 41 includes a plurality of labels 43 in a row. Here, the label roll paper sheet 41 extends in a direction parallel to the long side of the label 43.

The label roll paper sheet 41 includes a mount 42 and the label 43.

The mount 42 supports a plurality of labels 43 in a row at a predetermined interval. For example, the mount 42 supports the label 43 such that the label 43 can be peeled off from the mount 42. For example, the mount 42 is made of a material such as waxed paper, plastic, or vinyl.

The label 43 is a medium including a wireless tag 44 therein. The label 43 has a rectangular shape. The label 43 is formed by stacking a plurality of layers. The label 43 includes the wireless tag 44 between the plurality of layers. For example, the label 43 is made of a material such as paper, plastic, or vinyl. The label 43 may be made of the same material as that of the mount 42 or may be made of a different material.

The label roll paper sheet 41 includes a mark 45 on the back surface. The mark 45 indicates the top or bottom position of the label 43. The mark 45 is printed for each label 43. Here, the mark 45 is printed at the top position of the label 43.

Figure 5:
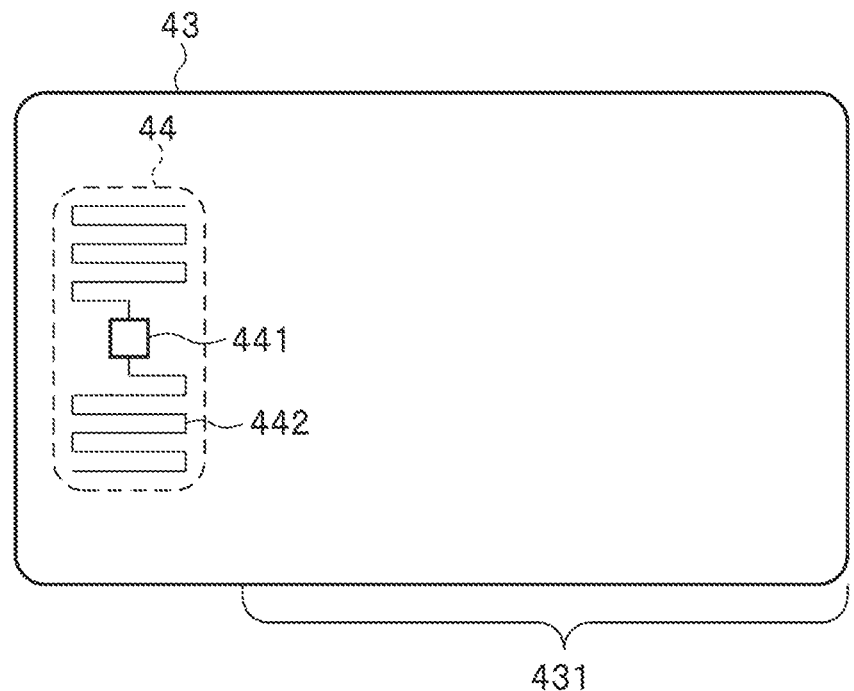
FIG. 5 is a view illustrating a configuration of a label according to an embodiment.

Next, the label 43 will be described more specifically. FIG. 5 illustrates a configuration of the label 43. As illustrated in FIG. 5, the label 43 includes the wireless tag 44, a print area 431, and the like. The label 43 may have one or more additional elements as necessary in addition to the elements illustrated in FIG. 5, and one or more elements shown in FIG. 5 may be excluded from the label 43.

The wireless tag 44 is disposed at a predetermined position on the label 43. In the example illustrated in FIG. 5, the wireless tag 44 is disposed on the top portion of the label 43. The wireless tag 44 may be disposed on the bottom portion of the label 43 or may be disposed at the center. The wireless tag 44 may be disposed at any location on the label 43.

The wireless tag 44 is embedded between the plurality of layers that configure the label 43. At least one wireless tag 44 is embedded in one label 43. The wireless tag 44 is configured to store particular data wirelessly transmitted from an external device, and wirelessly transmit particular data to the external device.

Here, the wireless tag 44 is an RFID. The wireless tag 44 complies with the Generation-2 (GEN2) standard.

As illustrated in FIG. 5, the wireless tag 44 includes an RFID chip 441, an antenna 442, and the like.

The RFID chip 441 controls the entire wireless tag 44. The RFID chip 441 will be described later.

The antenna 442 is an antenna for wirelessly communicating with an external device. The antenna 442 is also used to receive power from an external device. For example, the antenna 442 may be formed in a predetermined area in a mesh shape. The antenna 442 may be formed in a predetermined area in a circular shape.

The wireless tag 44 is activated by receiving a supply of power or the like from an external device in a non-contact manner. The wireless tag 44 receives a radio wave from an external device via the antenna 442 and a modulation demodulation circuit. A power supply unit of the RFID chip 441 is activated by the radio wave and generates an operation power and an operation clock.

When the wireless tag 44 is activated, the RFID chip 441 can perform data communication with an external device via the antenna 442. The RFID chip 441 receives the radio waves as changes in the impedance of the antenna 442.

For example, the RFID chip 441 receives an access password or the like from the reader-writer 16 or the like via the antenna 442 and establishes communication with the reader-writer 16. The RFID chip 441 transmits and receives data to and from the reader-writer 16 via the antenna 442.

The print area 431 is an area where various images can be printed by the print head 19. The print area 431 may be made of thermal paper or the like.

Next, a configuration example of the wireless tag 44 will be described.

Figure 6:
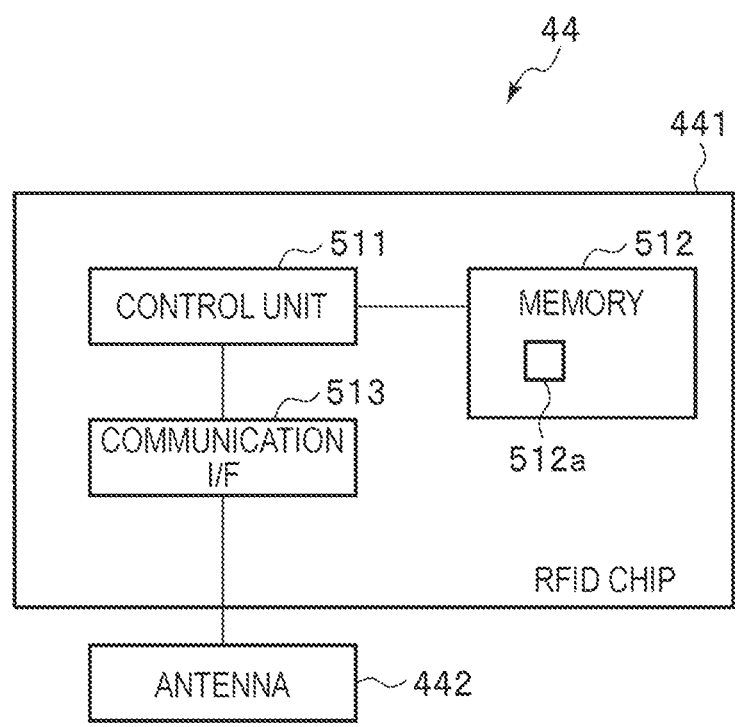
FIG. 6 is a block diagram illustrating a configuration of an RFID chip according to an embodiment.

FIG. 6 is a block diagram illustrating a configuration of the wireless tag 44. As illustrated in FIG. 6, the wireless tag 44 includes the RFID chip 441, the antenna 442, and the like. The antenna 442 is as described above. The wireless tag 44 may have one or more additional components as necessary in addition to the components illustrated in FIG. 6, and one or more components illustrated in FIG. 6 may excluded from the wireless tag 44.

The RFID chip 441 includes a control unit 511, a memory 512, a communication interface 513, and the like.

The control unit 511 has a function of controlling the operation of the RFID chip 441. The control unit 511 may include an internal cache and various interfaces. For example, the control unit 511 performs various processes using an internal memory or data stored in the memory. For example, the control unit 511 is a processor. The control unit 511 may be hardware such as a sequencer.

The memory 512 is a nonvolatile memory for storing data. The memory 512 stores various data based on the operation of the control unit 511. The memory 512 may store control data or the like in advance depending on the usage of the wireless tag 44. The memory 512 may temporarily store data being processed by the control unit 511, and the like.

The memory 512 includes a storage area 512a for storing the EPC (electronic product code).

The communication interface 513 is an interface for communicating with an external device via the antenna 442. The communication interface 513 may include a power supply unit that supplies power to the control unit 511 upon receipt of power from an external device.

The EPC is one of data stored in the memory 512 of the wireless tag 44 that complies with the GEN2 standard. The EPC is an ID for specifying the wireless tag 44. The EPC is an ID that can be rewritten by a user of the wireless tag 44. For example, the EPC is updated according to a command from an external device, or the like. The storage area 512a may store a tag ID (TID).

Next, the function of the control unit 511 will be described. The control unit 511 has a function of transmitting the EPC to the wireless tag processing device 1.

For example, upon receipt of a command for acquiring the EPC via the antenna 442, the control unit 511 acquires the EPC from the storage area 512a. The control unit 511 then controls the communication I/F 513 to transmit a response including the EPC to the wireless tag processing device 1 via the antenna 442.

The control unit 511 may control the communication I/F 513 to transmit the TID to the wireless tag processing device 1.

Next, functions performed by the wireless tag processing device 1 will be described. The functions of the wireless tag processing device 1 of this example are performed by the processor 111 executing a program stored in the controller 11, the memory 15, or the like.

First, the processor 111 has a function of setting a plurality of lists including a plurality of output values.

Here, the processor 111 sets two lists. For example, the memory 15 stores two lists in advance. The processor 111 acquires two lists from the memory 15 and sets the lists. The lists may be updated appropriately.

One list (hereinafter called the first list) includes a plurality of output values selected from settable output values. The other list (hereinafter called the second list) includes a plurality of output values selected from the remaining settable output values. In other words, the output values included in the first list and the output values included in the second list are different from each other.

The number of output values included in the first list and the number of output values included in the second list may be the same or different. The second list may include all the remaining settable output values after setting the first list. In addition to the output values included in the first list and the second list, there may be other settable output values that can be further set.

For example, the first list includes the first half of settable output values arranged in ascending order, and the second list includes the second half of the settable output values. For example, when there are eighteen settable output values, the first list includes first to ninth settable output values arranged in ascending order, and the second list includes tenth to eighteenth settable output values.

The first list may include odd-numbered settable output values arranged in ascending order. The second list may include even-numbered settable output values arranged in ascending order. In other words, the first list may include first, third, fifth, . . . and seventeenth settable output values, and the second list may include second, fourth, sixth, . . . and eighteenth settable output values.

The configuration of each list is not limited to the aforementioned examples. The processor 111 may set three or more lists. Here, the output values that configure each list are different from each other.

The processor 111 has a function of selecting one of the lists and determining a data acquisition output value from the selected list.

The data acquisition output value is an output value to be set to the reader-writer 16 and used when the reader-writer 16 acquires data (for example, the EPC) from the wireless tag 44. For example, the data acquisition output value is an output value at which data can be acquired stably from the wireless tag 44.

Here, the processor 111 selects the first list. In other words, the processor 111 determines the data acquisition output value from the first list.

First, the processor 111 controls the motor driver 20 to convey the label 43 to a plurality of positions. The processor 111 issues a command for setting each output value of the first list to the reader-writer 16 and controls the reader-writer 16 to acquire the EPC from the label 43 located at each position. The processor 111 acquires the received EPC and the reception intensity at each position and at each output value.

For example, the processor 111 controls the motor driver 20 and the like to convey the label roll paper sheet 41 to the initial position and stop the label roll paper sheet. For example, when the processor 111 detects the mark 45 through the sensor 24, the processor 111 controls the motor driver 20 to stop the label roll paper sheet 41. In other words, the initial position is the position where the processor 111 has detected the mark 45. The processor 111 may control the motor driver 20 to stop the label roll paper sheet 41 after the label roll paper sheet is conveyed by a predetermined distance after the mark 45 is detected. Here, the initial position is a position to which the label roll paper sheet 41 is conveyed by the predetermined distance after the processor 111 detects the mark 45.

When the label roll paper sheet 41 is stopped, the processor 111 selects an output value from the first list. For example, the first output value in the first list is selected. When the output value is selected, the processor 111 sets the selected output value in the reader-writer 16.

When the selected output value is set in the reader-writer 16, the processor 111 outputs a command for acquiring the EPC through the reader-writer 16. In response to the command for acquiring the EPC, the wireless tag 44 transmits a response including the EPC. If there are a plurality of wireless tags 44, the response including the EPC is received from each of the wireless tag 44.

Upon receipt of the response, the processor 111 stores the position of the wireless tag 44 (for example, a conveyance amount from the position where the processor 111 detects the mark 45), the set output value, the EPC, and the reception intensity, in the memory 15 or the like.

After storing the position and the like in the memory 15, the processor 111 selects the next output value from the first list. When selecting the output value, the processor 111 outputs the command as discussed above, and stores the position of the wireless tag 44, the set output value, the EPC, and the reception intensity in the memory or the like. The processor 111 executes the above-described operation for each output value of the first list.

When the above-described operation has been executed for each output value of the first list, the processor 111 controls the motor driver 20 to convey the label roll paper sheet 41 (that is, the wireless tag 44) downstream by a predetermined distance. After the label roll paper sheet 41 has been conveyed, the processor 111 executes the above-described operation for each output value of the first list.

When the above-described operation has been executed for each output value of the first list, the processor 111 controls the motor driver 20 to convey the label roll paper sheet 41 downstream by the predetermined distance again, and executes the above-described operation for each output value of the first list. The processor 111 repeats the above-described operation until the label roll paper sheet 41 is conveyed from the initial position by a predetermined distance (for example, the length of the label 43).

After acquiring the received EPC and the reception intensity at each position and at each output value, the processor 111 determines the data acquisition output value based on the EPC and the reception intensity at each position and at each output value.

For example, the processor 111 determines an output value that satisfies the following three conditions as a data acquisition output value.

Condition 1: The reception intensity of a wireless tag is equal to or greater than a first threshold value.

Condition 2: When the EPC is received from two or more wireless tags, the difference between the reception intensities of the two or more wireless tags is equal to or greater than a second threshold value.

Condition 3: A section (position region) in which Condition 2 is satisfied is equal to or greater than a third threshold value in length.

Figure 7:
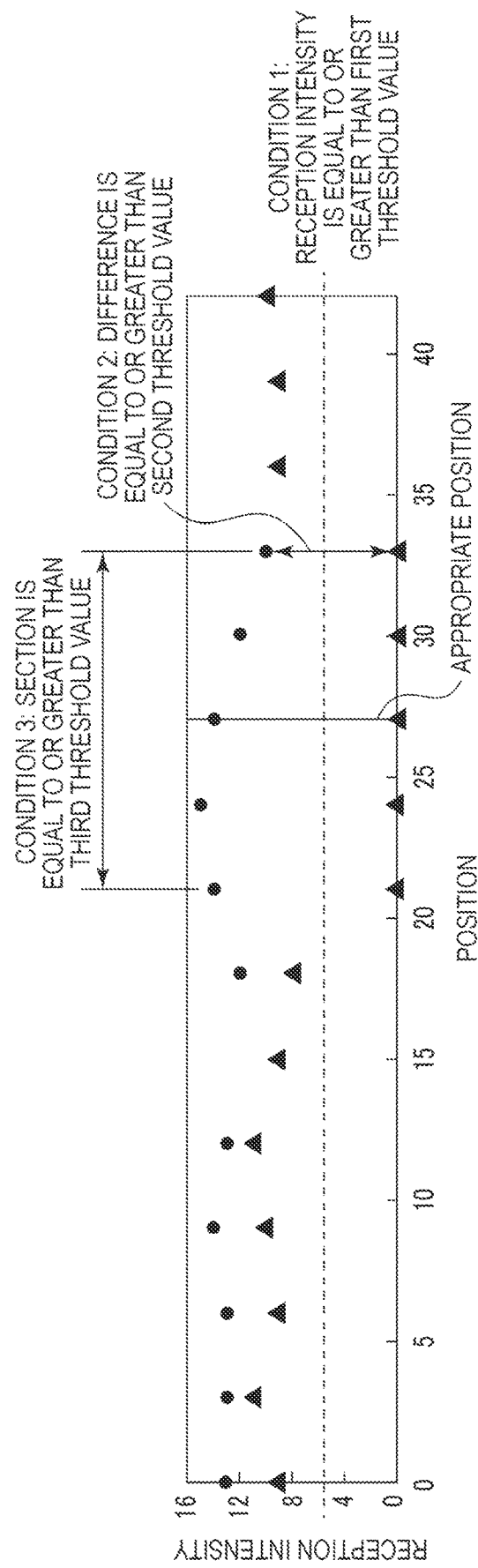
FIG. 7 is a view illustrating an operation for the wireless tag processing device to determine a data acquisition output value.

FIG. 7 illustrates an operation in which the processor 111 determines a data acquisition output value. FIG. 7 illustrates the relationship between the position of the label roll paper sheet 41 (more particularly the wireless tags 44) and the reception intensity at a predetermined transmission output value. The horizontal axis indicates the position of the label roll paper sheet 41 in a distance from the reader-writer 16 or the like. The vertical axis indicates the reception intensity. In FIG. 7, the symbol "●" (filled circle) indicates the strongest reception intensity, and "▲" (filled triangle) indicates the second strongest reception intensity at the position.

As illustrated in FIG. 7, when an output value is set, the processor 111 determines whether the strongest reception intensity is equal to or greater than the first threshold value as Condition 1 (that is, whether there is a position (or position region) where the strongest reception intensity is equal to or greater than the first threshold value). When it is determined that Condition 1 is satisfied, the processor 111 determines whether the difference between the two reception intensities at each position for which the Condition 1 (the strongest reception intensity is equal to or greater than the first threshold value) is met is equal to or greater than the second threshold value as Condition 2.

If Condition 2 is satisfied at one or more positions, the processor 111 determines whether the length of the section (position region) in which the Condition 2 is satisfied is equal to or greater than the third threshold value. If Condition 3 is satisfied, the processor 111 determines the presently utilized output value as a data acquisition output value.

When there are a plurality of output values that each satisfy Conditions 1 to 3, the processor 111 selects one output value from this plurality of output values as a data acquisition output value. For example, when there is continuous range of output values that satisfy Conditions 1 to 3, the processor 111 selects the central (median) output value as the data acquisition output value.

The processor 111 may determine an appropriate position from which data is acquired from the wireless tag 44 or for which data is stored in the wireless tag 44. For example, the processor 111 sets the center position of the section satisfying Condition 3 as the appropriate position for reading/writing data from/to the wireless tags 44.

When there is no data acquisition output value in the selected list (that is, when there is no output value that satisfies Conditions 1 to 3), the processor 111 selects a data acquisition output value from a different list. However, the processor 111 may, in a process similar to that already described, determine the data acquisition output value from the other list.

Figure 8:
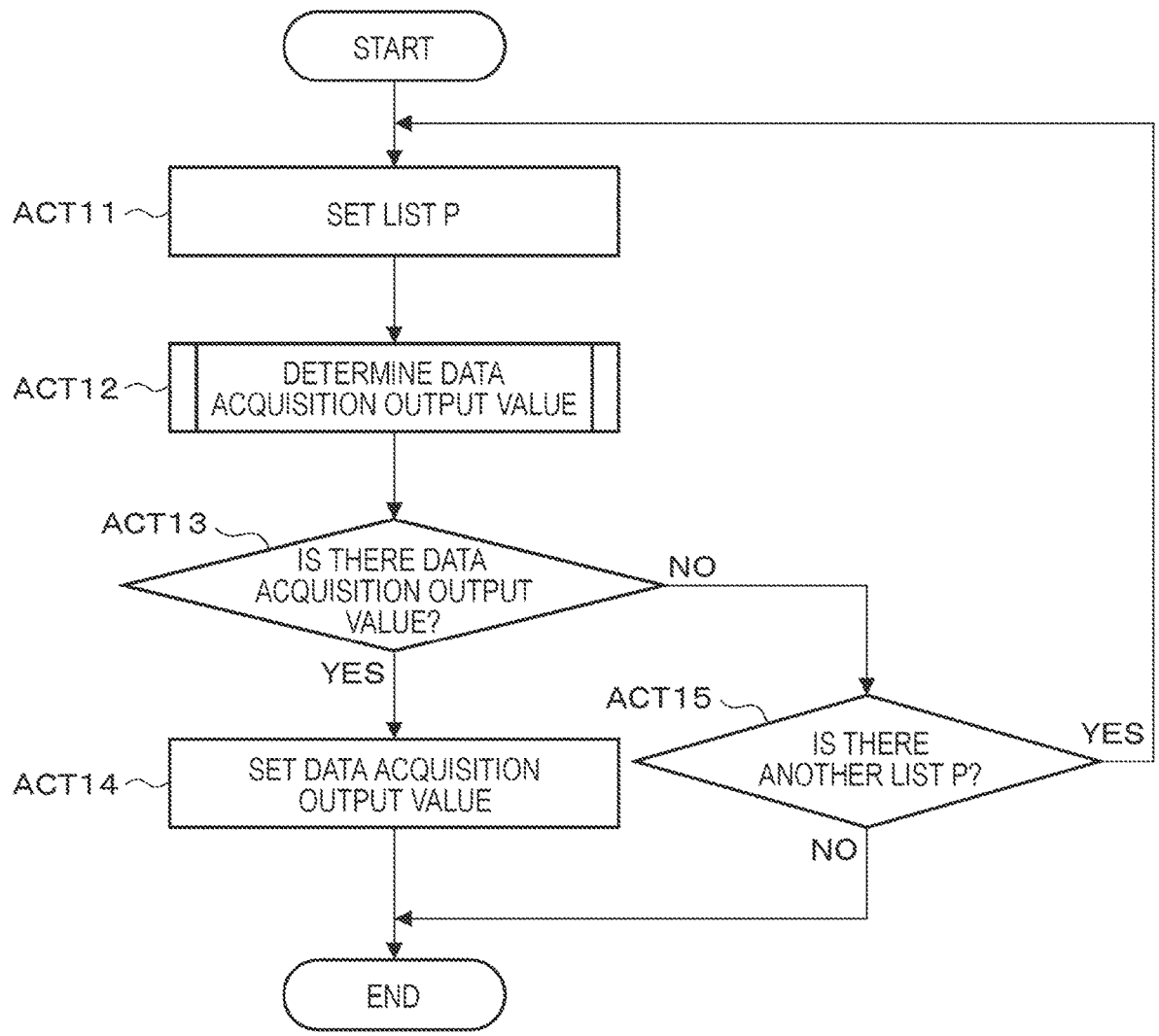
FIGS. 8 and 9 each are a flowchart of an operation performed by the wireless tag processing device.

Next, an operation example of the processor 111 will be described. FIG. 8 is a flowchart of the operation performed by the processor 111.

First, the processor 111 retrieves or generates one or more lists P each including different settable output values as discussed above (ACT 11). Then, the processor 111 determines a data acquisition output value from one of the lists P according to the procedure explained with reference to FIG. 7 (ACT 12).

When it is determined that the data acquisition output value is determined from the list P (ACT 13, YES), the processor 111 sets the data acquisition output value in the reader-writer 16 (ACT 14).

When determining that there is no data acquisition output value in the set list P (ACT 13, NO), the processor 111 determines whether there is another list P (ACT 15). When it is determined that there is another list P (ACT 15, YES), the processor 111 returns to ACT 11.

When the data acquisition output value is set in the reader-writer 16 (ACT 14) or when it is determined that there is no other list P (ACT 15, NO), the processor 111 ends the operation.

Figure 9:
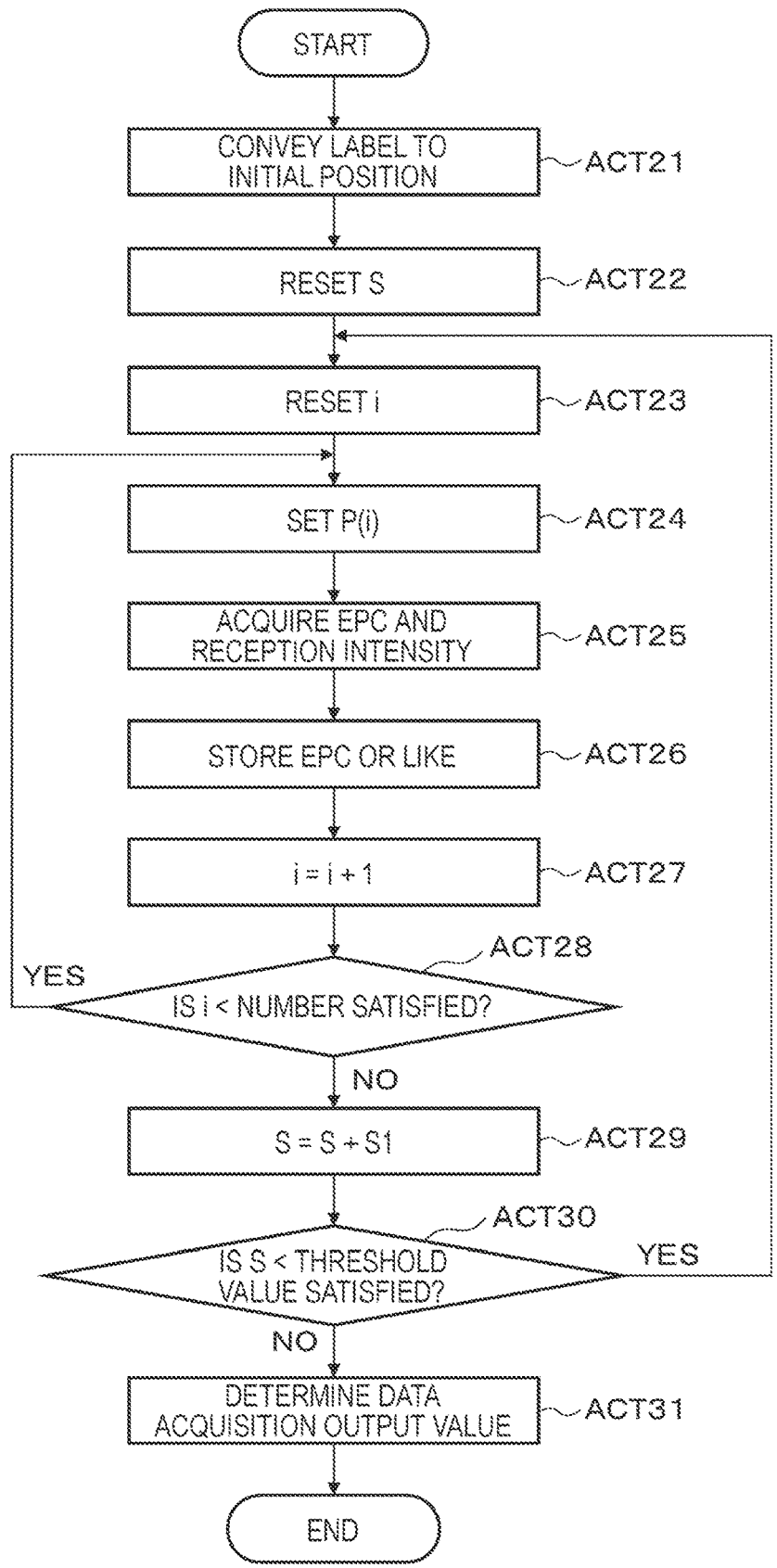

Next, an operation in which the processor 111 determines a data acquisition output value from the list P (ACT 12) will be described. FIG. 9 is a flowchart of the operation in which the processor 111 determines a data acquisition output value from the list P.

First, the processor 111 controls the motor driver 20 and the like to convey the wireless tag 44 to the initial position (ACT 21). When the wireless tag 44 has been conveyed to the initial position, the processor 111 resets S indicating the conveyance amount from the initial position (S=0) (ACT 22).

When S is reset, the processor 111 resets i (i=0) (ACT 23). After resetting i, the processor 111 sets P(i) in the reader-writer 16 (ACT 24). Here, P(i) is the i-th element (i.e., i-th output value) of the list P.

When P(i) is set in the reader-writer 16, the processor 111 acquires the EPC and the reception intensity of the wireless tag 44 through the reader-writer 16 (ACT 25). After acquiring the EPC and the reception intensity of the wireless tag 44, the processor 111 stores S (position), P(i), EPC, and reception intensity in the memory 15 or the like (ACT 26).

When S (position), P(i), EPC, and reception intensity are stored in the memory 15 or the like, the processor 111 increments i (i=i+1) (ACT 27). After incrementing i, the processor 111 determines whether i is smaller than the number of items in the list P (that is, the number of output values in the particular list P) (ACT 28).

When it is determined that i is smaller than the number of items in the list P (ACT 28, YES), the processor 111 returns to ACT 24.

When it is determined that i is equal to or greater than the number of items in list P (ACT 28, NO), the processor 111 conveys the wireless tag 44 downstream by a predetermined distance (S1) (S=S+S1) (ACT 29). After the wireless tag 44 is conveyed downstream by a predetermined distance, the processor 111 determines whether S is smaller than a threshold value (for example, the length of the label 43) (ACT 30).

When it is determined that S is smaller than the threshold value (ACT 30, YES), the processor 111 returns to ACT 23.

When it is determined that S is equal to or greater than the threshold value (ACT 30, NO), the processor 111 determines a data acquisition output value based on S (position), P(i), EPC, reception intensity, and the like which are stored in the memory 15 and the like (ACT 31).

When the data acquisition output value is determined, the processor 111 ends the operation.

The processor 111 may determine an appropriate position in the ACT 31. The processor 111 may set an appropriate position in the ACT 14.

The processor 111 may initially retrieve or generate a list including output values that are likely to be determined as an appropriate output value, and initially determine the data acquisition output value from the list.

The processor 111 may store the data in the wireless tag 44 after determining the data acquisition output value for the reader-writer 16. For example, the processor 111 controls the reader-writer 16 to transmit, using the data acquisition output value, a command to acquire the EPC from the wireless tag 44. The processor 111 sets an output value higher than the data acquisition output value in the reader-writer 16 and stores the data in the wireless tag 44 of the EPC.

The processor 111 may control the print head 19 to print an image on the wireless tag 44.

The antenna 17 may be movable by a moving mechanism. Here, the processor 111 may control the moving mechanism to convey the antenna 17 without controlling the motor driver 20 to convey the wireless tag 44.

The wireless tag processing device configured as described above groups the output values that can be set in the reader-writer into a plurality of lists. The wireless tag processing device determines a data acquisition output value from the output values included in one list. When there is no data acquisition output value in the list, the wireless tag processing device determines the data acquisition output value from the next list. As a result, the wireless tag processing device can determine the data acquisition output value by limiting the search range. Therefore, the wireless tag processing device can effectively determine the data acquisition output value.

In the aforementioned embodiments, a case in which a program for providing the functions for implementing an example embodiment is recorded in the device in advance has been described, but the embodiments are not limited thereto, and such a program may be downloaded from a network to the device or stored in the recording medium later installed in the device, or otherwise transferred to the device. As a recording medium, in general, any format may be used as long as the recording medium, such as a CD-ROM, can store a program and be read by a device. As described above, the function(s) obtained by installing or downloading a program may be realized in cooperation with an operating system (OS) or the like of the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag processing device, comprising:
   a conveying unit configured to transport a sheet including a plurality of wireless tags along a conveyance path;
   a wireless tag reader-writer configured to communicate with the wireless tags; and
   a processor configured to:
   acquire a plurality of lists of parameter values, wherein the parameter values of each of the lists do not overlap the parameter values of the other lists,
   repeat a process until a list including parameter values that satisfy a predetermined condition is found, the process including:
   selecting one of the lists, and
   controlling the conveying unit to transport the sheet and, at each of a plurality of predefined positions along the conveyance path, controlling the reader-writer to transmit a radio wave using each of the parameter values of the selected list and acquiring an intensity of a response wave received from one of the wireless tags for said each of the parameter values, wherein for each of the parameter values, the acquired intensity is used to determine whether the predetermined condition has been satisfied, and
   select one of the parameter values of the list that has been found in the process as a parameter value to be used by the reader-writer.

2. The wireless tag processing device according to claim 1, wherein the predetermined condition is satisfied when the following conditions:
   (i) the highest intensity is greater than or equal to a first threshold value, and
   (ii) a difference between the highest and second highest intensities is greater than or equal to a second threshold value,
   are satisfied at a predetermined number of the predefined positions that are continuous along the conveyance path.

3. The wireless tag processing device according to claim 1, wherein the lists include:
   a first list including first parameter values that are a subset of predetermined parameter values, and
   a second list including second parameter values that are another subset of the predetermined parameter values.

4. The wireless tag processing device according to claim 3, wherein each of the first parameter values is smaller than any of the second parameter values.

5. The wireless tag processing device according to claim 3, wherein the first and second parameter values are odd and even numbers, respectively.

6. The wireless tag processing device according to claim 1, wherein the sheet is a label sheet included in a paper roll.

7. The wireless tag processing device according to claim 6, wherein the lists include:
   a first list including first parameter values that are a subset of predetermined parameter values and are odd numbers, and
   a second list including second parameter values that are another subset of the predetermined parameter values and are even numbers.

8. The wireless tag processing device according to claim 6, wherein the paper roll includes a plurality of label sheets each including a single wireless tag.

9. A method for controlling a wireless tag processing device having a wireless tag reader-writer configured to communicate with a plurality of wireless tags included in a sheet conveyed by the wireless tag processing device along a conveyance path, the method comprising:
   acquiring a plurality of lists of parameter values, wherein the parameter values of each of the lists do not overlap the parameter values of the other lists,
   repeating a process until a list including parameter values that satisfy a predetermined condition is found, the process including:
   selecting one of the lists, and
   transporting the sheet and, at each of a plurality of predefined positions along the conveyance path, transmitting a radio wave using each of the parameter values of the selected list and acquiring an intensity of a response wave received from one of the wireless tags for said each of the parameter values, wherein for each of the parameter values, the acquired intensity is used to determine whether the predetermined condition has been satisfied, and
   selecting one of the parameter values of the list that has been found in the process as a parameter value to be used by the reader-writer.

10. The method according to claim 9, wherein the predetermined condition is satisfied when the following conditions:
    (i) the highest intensity is greater than or equal to a first threshold value, and
    (ii) a difference between the highest and second highest intensities is greater than or equal to a second threshold value,
    are satisfied at a predetermined number of the predefined positions that are continuous along the conveyance path.

11. The method according to claim 9, wherein the lists include:
    a first list including first parameter values that are a subset of predetermined parameter values, and
    a second list including second parameter values that are another subset of the predetermined parameter values.

12. The method according to claim 11, wherein each of the first parameter values is smaller than any of the second parameter values.

13. The method according to claim 11, wherein the first and second parameter values are odd and even numbers, respectively.

14. The method according to claim 9, wherein the sheet is a label sheet included in a paper roll.

15. The method according to claim 14, wherein the lists include:
- a first list including first parameter values that are a subset of predetermined parameter values and are odd numbers, and
- a second list including second parameter values that are another subset of the predetermined parameter values and are even numbers.

16. The method according to claim 14, wherein the paper roll includes a plurality of label sheets each including a single wireless tag.

* * * * *